United States Patent [19]

Forsse et al.

[11] Patent Number: 4,949,327
[45] Date of Patent: Aug. 14, 1990

[54] METHOD AND APPARATUS FOR THE RECORDING AND PLAYBACK OF ANIMATION CONTROL SIGNALS

[75] Inventors: Earl K. Forsse, Granada Hills; Larry K. Larsen, Canogo Park; John M. Davies, Acton; Darwin Thompson, Jr., Reseda, all of Calif.

[73] Assignee: Gray Ventures, Inc., Fremont, Calif.

[21] Appl. No.: 285,288

[22] Filed: Dec. 15, 1988

Related U.S. Application Data

[63] Continuation of Ser. No. 761,960, Aug. 2, 1985, abandoned.

[51] Int. Cl.$^5$ .............................................. G11B 31/00
[52] U.S. Cl. .................................. 369/58; 369/64; 369/70; 446/301; 446/302; 446/338
[58] Field of Search ................ 369/19, 20, 31, 58, 369/63, 64, 69, 70; 360/8, 27, 79, 80; 40/457; 446/175, 191, 297–303, 338, 343, 354, 369, 484

[56] References Cited

U.S. PATENT DOCUMENTS

| | | | |
|---|---|---|---|
| 754,825 | 3/1904 | Spencer et al. | 369/63 X |
| 2,250,916 | 7/1941 | Magruder | 446/302 X |
| 2,603,912 | 7/1952 | Gruber | 369/70 X |
| 2,700,250 | 1/1955 | Williams | 446/338 X |
| 2,704,417 | 3/1955 | Evans | 446/484 X |
| 2,867,049 | 1/1959 | Brackensey | 40/457 |
| 3,036,271 | 5/1962 | Alexander et al. | |
| 3,124,645 | 3/1964 | Whitney . | |
| 3,131,497 | 5/1964 | Rogers | 446/302 X |
| 3,162,980 | 12/1964 | Hellman | 369/63 X |
| 3,246,409 | 4/1966 | Taylor et al. | 40/457 |
| 3,287,849 | 11/1966 | Weiss | 369/64 X |
| 3,292,610 | 12/1966 | Newman | 446/301 X |
| 3,461,457 | 8/1969 | Kawamura et al. | 360/79 |
| 3,469,039 | 9/1969 | Lee | 360/8 |
| 3,509,549 | 4/1970 | Ohta et al. | 360/79 |
| 3,552,037 | 1/1971 | Stern . | |
| 3,568,336 | 3/1971 | Noble | 446/191 X |
| 3,570,178 | 3/1971 | Green | 446/343 |
| 3,827,080 | 7/1974 | Gendrot | 360/80 |
| 3,912,694 | 10/1975 | Chiappe et al. | 446/354 X |
| 3,921,161 | 11/1975 | Baer | 360/79 X |
| 4,107,462 | 8/1978 | Asija | 446/297 X |
| 4,139,968 | 2/1979 | Milner | 446/301 |
| 4,177,589 | 12/1979 | Villa | 446/175 X |
| 4,207,704 | 6/1980 | Akiyama | 446/369 X |
| 4,267,551 | 5/1981 | Dankman et al. | 446/303 X |
| 4,272,915 | 6/1981 | Noble | 446/298 |
| 4,521,205 | 6/1985 | Spector | 369/70 X |
| 4,578,718 | 3/1986 | Parker et al. | 360/27 X |
| 4,579,540 | 4/1986 | Ho | 446/301 |

*Primary Examiner*—Alan Faber
*Assistant Examiner*—W. R. Young

[57] ABSTRACT

Methods and apparatus for the recording and playback of animation control signals, including voice, are disclosed. In accordance with the method, a dual track cassette recording is made, one track consisting of a voice channel and the other track consisting of a plurality of control signals for the control of animation, and in some instances for control of the speaker or speakers through which the voice channel will be played back, whereby two or more animated characters may appear to speak to each other or speak or sing in unison are disclosed. The control signals are pulse width modulated signals to provide, in general, proportional control signals to provide proportional control, through appropriate servo motors and the like, of the animated elements such as mouth, eyes, etc. of the animated character. The pulse width modulated signals, together with a sync signal, are recorded directly on a cassette tape without modulation on a carrier frequency, despite the varying unsymmetrical wave forms, thereby allowing the compaction of a substantial number of control signals within the frequency band of reasonably priced playback units.

21 Claims, 4 Drawing Sheets

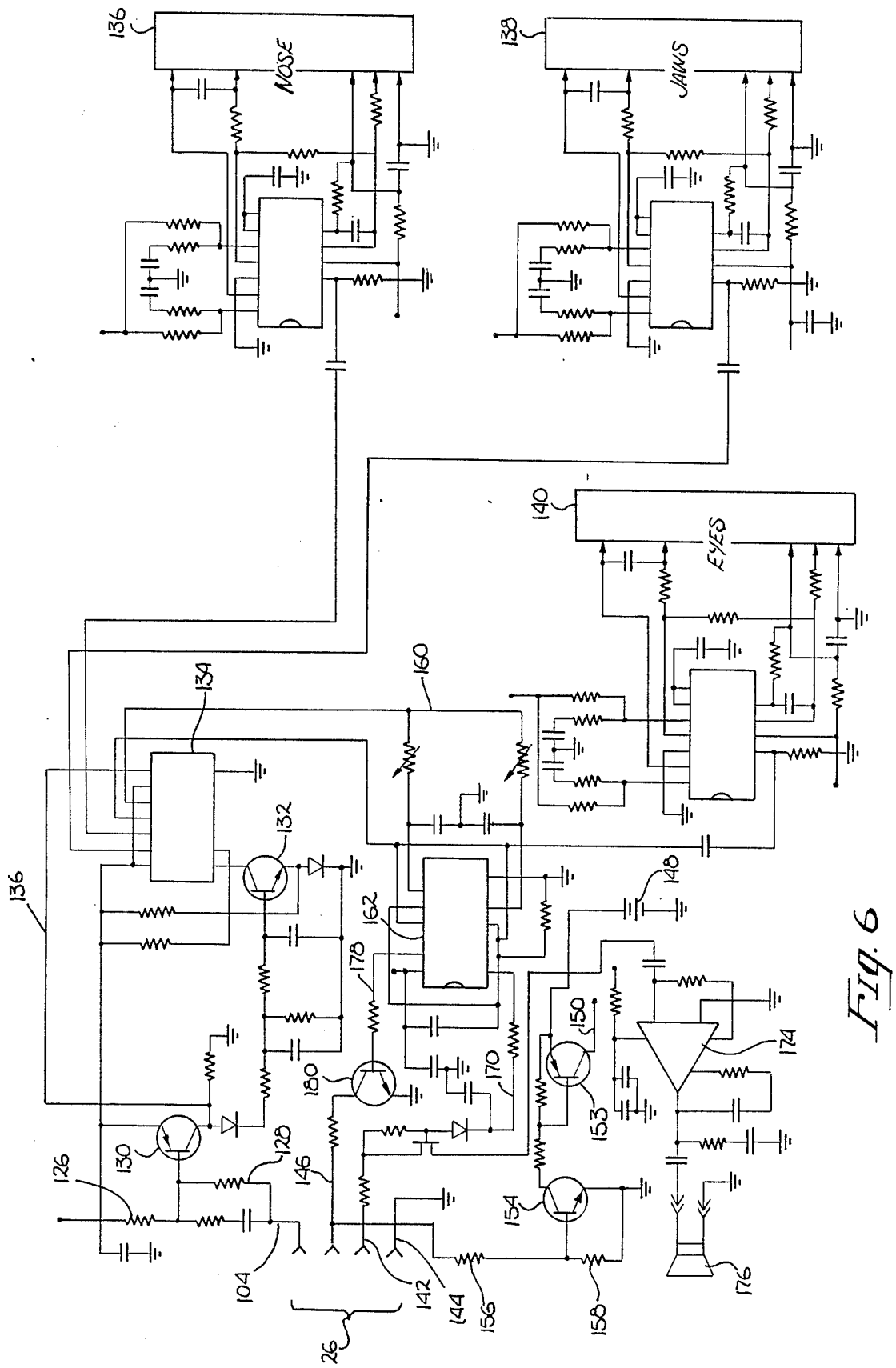

METHOD AND APPARATUS FOR THE RECORDING AND PLAYBACK OF ANIMATION CONTROL SIGNALS

This is a continuation of application Ser. No. 761,960 filed Aug. 2, 1985, now abandoned.

BACKGROUND OF THE INVENTION

1. The present invention relates to the field of animation control recording and playback systems.

2. Prior Art.

When a doll or other character comes forth with a voice or other sound generated by a tape playback unit, mechanical mechanism or other device, the impression is left that the doll or other character has generated the voice or other sound by a tape playback unit, mechanical unit or other device. If the sound generated is coupled with some form of motion, the impression is improved. Still further improvement results from the synchronization of the motion with the sound, with multichannel synchronized proportional control of various facial and/or body motions, whether with one or more than one animated character, potentially providing life-like appeal. Various attempts have been made to achieve life-like animation of one or more characteristics of the living character, as exemplified by the following prior art.

In U. S. Pat. No. 3,131,497 entitled "Animated Talking Figures", an animated bird is disclosed which is controlled either by a single track tape machine or a dual track tape machine located distant to the animated bird. One track of the dual track machine provides the "voice" track of the system, with the other track providing an on/off control which controls the opening and closing of the beak, and the simultaneous motion of the tail of the animated bird between a tail up and tail down position. Since real birds tend to move with relatively jerky motions between very fixed positions, the effect of the animation of a bird achievable by this system is reasonable. The same general approach however, is not suitable for the animation of mammal-like characters, as the lack of proportional control and additional independent animated elements is inappropriate for such use.

The foregoing general technique is improved in U. S. Pat. No. 3,246,409 entitled "Animated Figure" wherein a bird-like animated figure is disclosed. In accordance with this patent, a dual track tape reproduction system is used to provide an audio signal, and by amplitude detection, a beak control. On a second track a frequency multiplexed signal comprising any combination of five nonharmonic frequencies is provided, the presence or absence of any one of which will control the turning of the head to the left or to the right, body tilt, head tilt or chest expansion of the animated bird, all on an on/off basis. Given the nature of real birds as commented on before, the simulation of reality achievable by this technique is undoubtedly very good, though again the lack of proportional control imposes substantial limitations on the use of this method in creating animation simulating mammal-like characteristics such as mouth motion associated with ordinary speech, singing, etc.

One other general class of animation control system should be described herein, as it is relevant not so much to the control of an animated character by prerecorded voice and animation control signals, but rather because of its generation of signals having a similar purpose from the audio track itself. In particular, reference is made to U. S. Pat. No. 4,177,589. This patent discloses the movement of artificially animated three-dimensional figures and especially the simulation of human facial expressions in three-dimensional facial figures utilizing proportional control by frequency discrimination from the audio signal to control pneumatic servos effecting the life-like distortion of a flexible face made of a material such as polyvinyl chloride plastic Other devices of these and other types include those disclosed in the following U.S. Pat. Nos. 2,250,916, 2,700,250, 2,704,417, 2,867,049, 3,162,980, 3,292,610, 3,469,039, 3,568,336, 3,570,178, 3,912,694, 4,107,462, 4,207,704, 4,267,551, 4,272,915

BRIEF SUMMARY OF THE INVENTION

Methods and apparatus for the recording and playback of animation control signals, including voice, are disclosed. In accordance with the method, a dual track cassette recording is made, one track consisting of a voice channel and the other track consisting of a plurality of control signals for the control of animation, and in some instances for control of the speaker or speakers through which the voice channel will be played back, whereby two or more animated characters may appear to speak to each other or speak or sing in unison are disclosed. The control signals are pulse width modulated signals to provide, in general, proportional control signals to provide proportional control, through appropriate servo motors and the like, of the animated elements such as mouth, eyes, etc. of the animated character. The pulse width modulated signals, together with a sync signal, are recorded directly on a cassette tape without modulation on a carrier frequency, despite the varying unsymmetrical wave forms, thereby allowing the compaction of a substantial number of control signals within the frequency band of reasonably priced playback units. The number of animation control channels achievable in a single track is relatively large, allowing the interconnection of one or more additional animated characters and the use of one or more channels to control which character or characters the voice channel is played back through. The system operates on an appropriately recorded standard cassette and playback unit which may be located in one of the animated characters or otherwise, with the exception that the cassette includes an additional depression or hole which provides clearance for a cooperatively disposed operating element of a switch which, upon depression by the insertion of a standard (nonanimation) cassette, will redirect the signal from what would have been the animation control system to a summary amplifier to result in the audio channel providing monaural playback of standard stereo cassettes. Various embodiments are disclosed.

BRIEF DESCRIPTION OF THE DRAWINGS

FIG. 6 is a schematic of one embodiment of a slave unit.

DETAILED DESCRIPTION OF THE INVENTION

Figure 1:
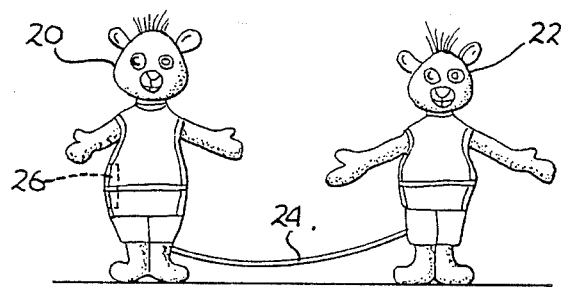
FIG. 1 is a schematic representation of a pair of stuffed animals animated in accordance with the present invention.

First referring to FIG. 1, a typical application of the present invention may be seen. In this application two caricatures are provided such as, by way of example, stuffed animals 20 and 22 connected by a removable line or cable 24. Animal 20, sometimes also referred to herein as the master or master unit, is provided with a tape playback unit 26 accessible from the back of the animal for the playback of special animation cassettes as hereinafter described. The playback unit 26 is a slightly modified stereo playback unit having two tape heads, each for a respective one of two tracks on a tape cassette inserted thereinto, the tracks being positioned and the playback unit having the same speed as a conventional stereo playback unit. Accordingly, standard stereo cassettes may be inserted and played, though as shall subsequently be described, such cassettes will play differently than the animation cassettes specially configured and recorded for such purpose.

One of the two tracks on an animation cassette intended to be used with the system, specifically referred to as track 2 for specificity herein, is the voice or sound track for both master unit 20 and the slave unit 22. In a typical application the sound track will at times consist of the voice for the master unit 20, at other times the voice for the slave unit 22, and at still other times, simultaneous voice signals for both units when the two animals are both speaking, singing or making other simultaneous sounds. The generation of the voice track may be done using conventional recording techniques, though of course as before the two (or more, if additional slave units are used) voices of the two animals are combined on the single voice track.

The signal recorded on track 1, the animation track, is a pulse width modulation signal which when demodulated will provide a plurality of animation signals which can be used for the proportional control of various animated movements of both the master unit 20 and of the slave unit 22, as well as the control of such functions as which unit, the master, slave or both, the voice channel will play back through at any particular time.

Figure 2:
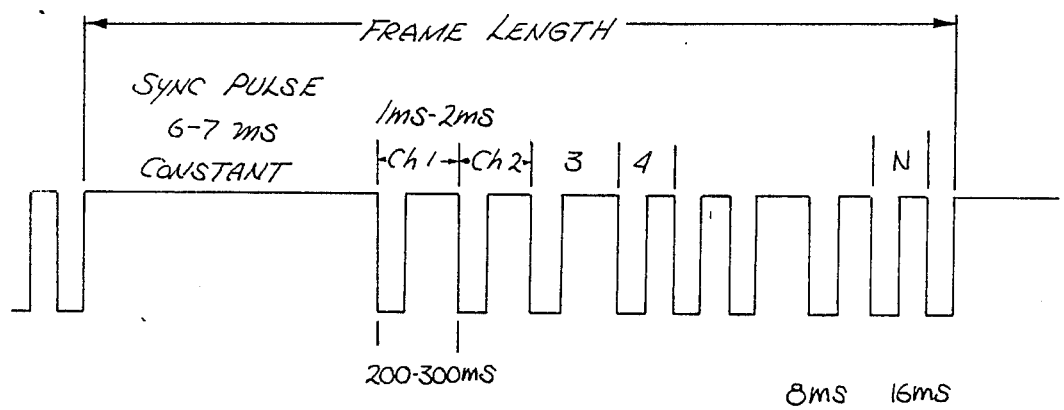
FIG. 2 is an illustration of a typical signal format of a typical pulse width modulated signal frame.
Figure 3:
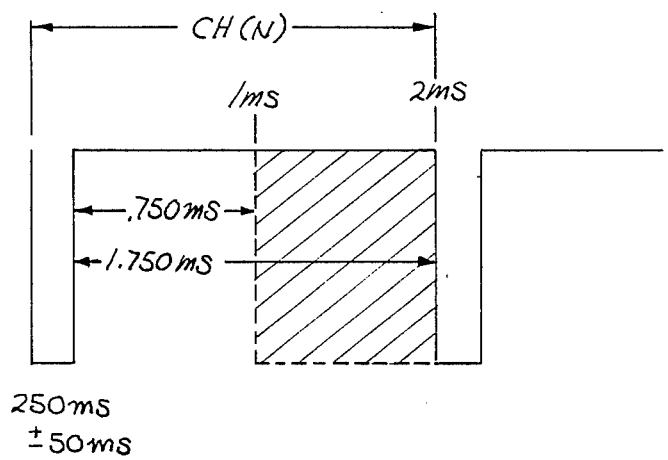
FIG. 3 is an illustration of a typical signal format for an individual channel for each of the first eight channels of the signal illustrated in FIG. 2.

The form of the animation signal is illustrated in FIGS. 2 and 3. As shown in FIG. 2, a frame of animation signals is initiated by a sync pulse which in the preferred embodiment has a duration of approximately six to seven milliseconds, and is recognizable as a sync pulse because of that duration. The pulse is illustrated as being in the positive direction, though for reasons which will subsequently be described, it will be noted that no zero reference has been given for either of FIGS. 2 and 3. For purposes of reference the sync pulse shall be considered as a positive pulse succeeded by a number of successive channel signals, in the embodiment being described nine successive channel signals CH1 through CH9.

Each channel signal has the same general wave shape as illustrated in FIG. 3. In particular each channel signal ends with a negative pulse (again using an arbitrary reference) of approximately 250 microseconds in duration, followed by a positive pulse of a duration dependent upon the information or signal content of that channel. In the preferred embodiment, for a signal of one extreme referred to for convenience as the low or negative signal, the positive pulse will have a minimum duration of approximately 750 microseconds, whereas for a signal of the opposite extreme, referred to for convenience as a high or positive signal, the positive pulse will have a duration of approximately 1.75 milliseconds. In general, the pulse width may vary anywhere between these two extremes to give proportional control if desired upon demodulation of the pulse width modulation signal. Obviously any desired nonlinearity may also be injected, either at the time of generating the modulated signal or by a controlled nonlinearity of the animation drive, typically a servo responding to the demodulated signal.

Also in certain instances, while continuous variation of the pulse width of any channel is possible, certain signals may be specifically limited to two or more discreet states, represented by two or more specific pulse widths or at least pulse width bands. By way of more specific example, in the embodiment described herein, channel 5 is the audio switching channel, the demodulated signal from which determines whether the voice channel is played back through the speaker in the master unit 20, the slave unit 22 or through both the master and slave units. Thus while the pulse width modulated signal of any channel may range in total duration, including the initial negative pulse, from 1 millisecond to 2 milliseconds, the signal in channel 5 is in effect a three state signal, one state holding the speaker of the master unit on, a second state holding both speakers on and the third state only holding the slave unit speaker on. To be more specific, a signal in the range of 1 millisecond to 1.7 milliseconds will hold the master unit speaker on, with a signal between 1.3 milliseconds and 2 milliseconds holding the slave unit speaker on. Thus a signal at the low extreme holds the master unit speaker on, at the high extreme holds the slave unit speaker on, and at the midpoint holds both on. Thus while continuous (linear or nonlinear) control of the channel 5 signal could be accomplished, it is best to either switch between the three states, or at least quickly move through the boundaries between states at the time of recording to avoid possible ambiguity in the demodulated signal.

It will be noted that the signal of each channel is variable in duration depending upon its information content, so that the entire frame length (FIG. 2) is also variable. Actually as shall subsequently be seen, the ninth channel is in effect a dummy channel for clocking purposes and accordingly is not modulated. In general, the desired animation signals will not vary in unison so that the overall frame length will not tend to vary to the same extent or proportion as individual channels will. In general, the frame length will usually stay within the range of approximately 17 to 20 milliseconds, giving a frame rate or/and channel data update rate approximately in the range of 50 to 60 Hz. This is much higher than is needed to produce life-like motion of the animated elements of a character, even relatively realistic motions synced to a talking or singing voice track. Actually while the specific system disclosed herein has eight channels of programmable information, experimental units having the capacity of 16 or more channels, which of course reduces the frame repetition rate accordingly, have given highly adequate results.

The general pulse width modulation technique hereinbefore described giving a variable frame length has been used before in the case of radio controlled models and the like. In such an application, the pulse width modulated signal is itself modulated on an RF carrier, which achieves two useful functions. First of course, the carrier is selected to appropriately fall within the RF band for such communication, thereby allowing the transmission of the modulated signal on the RF carrier from the transmitter to the receiver of the radio controlled unit. Secondly, the RF modulation of the unsymmetrical wave form of the pulse width modulated signal results in a symmetrical modulated wave form compatible with AC coupled amplifiers, RF communication techniques, etc. Theoretically one should similarly modulate the signal of FIG. 2 on an appropriate carrier before recording by magnetic recording techniques, as magnetic recording and playback techniques will not allow the direct recording and reproduction of an unsymmetrical wave. However a unique aspect of the present invention is the fact that in spite of this limitation of magnetic recording and playback techniques, an animation control signal of the general form shown in FIG. 2 is in fact directly recorded on the animation track, and played back in the playback unit 26 of the master 20 (FIG. 1), with the associated electronics to be described recovering the animation control signals as desired.

Figure 4:
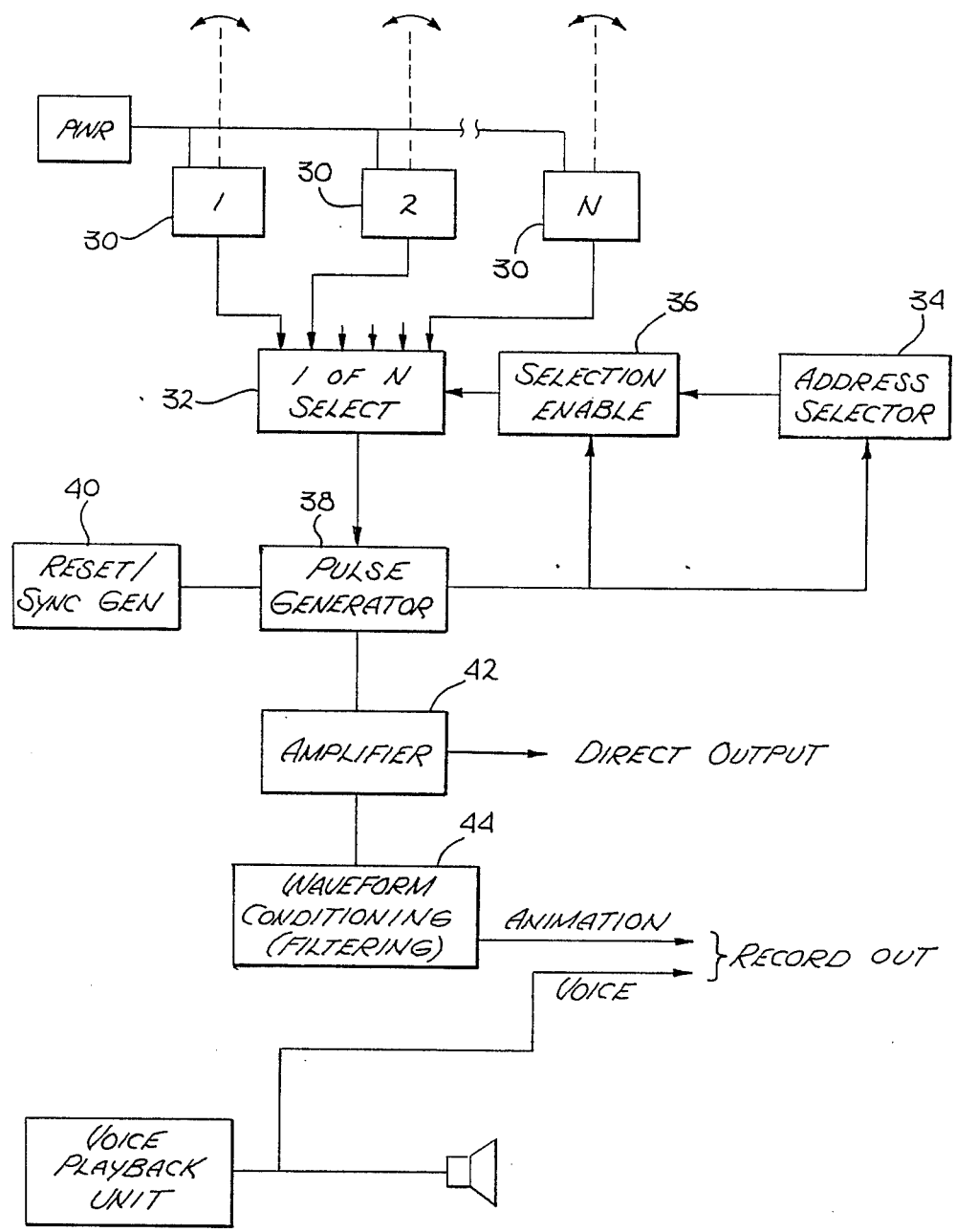
FIG. 4 is a block diagram illustrating the method and apparatus of recording and animation cassette in accordance with the present invention.

In particular, a system for creating the tape is schematically illustrated in FIG. 4. The first step in creating a tape is to record the voice track which, by way of example, may swap back and forth between the simulated voices of the master and slave units, and at times have both voices speak or sing, etc. Once this has been accomplished, the voice track may be played back while operators control the various functions of the master and slave units in synchronism with the voice track, during which time those various control signals are appropriately pulse width modulated, repeatedly assembled into frames and recorded. In particular, a plurality of manual controls 30 are provided for control by operators during the recording of the animation signals. The manual controls of the animation signals for mouth movements and the like would be potentiometers, providing a form of continuous control from one extreme to the other, though in the case of the audio signal switching previously described, a three position switch could be used. A selector 32 is coupled to receive the control signals from the various controls 30 in sequence, as controlled by the address selector 34 and select and enable 36. The selected signal in turn is coupled to the pulse generator 38 controlled by the reset/sync generator 40. The reset/sync generator controls the pulse generator 38 so as to first generate a sync pulse for output to amplifier 42, and to thereafter pulse width modulate each signal coupled thereto from the selector 32, advancing the selection of the controller 30 by successive advancement of the address of the address selector 34 and coupling of the same through the selector enable 36 to the selector 32. Accordingly, the output signal of the pulse generator 38 is the signal illustrated in FIG. 2.

A direct output signal may be taken directly from amplifier 42 and coupled to the animated character or characters so that the persons doing the animation in synchronism with the replay of the voice track can simultaneously view the resulting animated motion for its inherent interactive value in controlling the various functions. The output of the amplifier 42 is also coupled to a wave form conditioning system 44 to provide some wave shaping and conditioning to better facilitate the direct recording of the signal on magnetic tape. For this purpose, a conventional equalizer has been found to be highly useful, as such devices allow the selective attenuation or reinforcement of various frequency bands throughout the recordable spectrum. In that regard, since the coupling and recording equipment as well as playback equipment is in general AC coupled, the DC level of the recovered wave at least initially will drift, depending in essence on the cumulative characteristics of the various animation control signals being pulse width modulated. What is important is that the so called positive signals in the recovered wave be sufficiently free of any oscillation or ringing so as to always exceed a detectable threshold, and of course similarly the so called negative signals similarly be free of ringing or oscillations and be of a sufficiently low level as to always be distinguishable from the high signal. In general it has been found that some emphasis of certain low frequencies and attenuation of certain high frequencies, while significantly distorting the signal from the ideal signal shown in FIG. 2, limits ringing while still preserving the information content in the recovered (recorded and played back) animation signals with clearly an unambiguously detectable high and low levels in spite of the distortion of the wave form and apparent wandering of the DC level. The filtering will of course depend on the frequency response of the playback unit, which should be allowed for when selling the filters.

Figure 5:
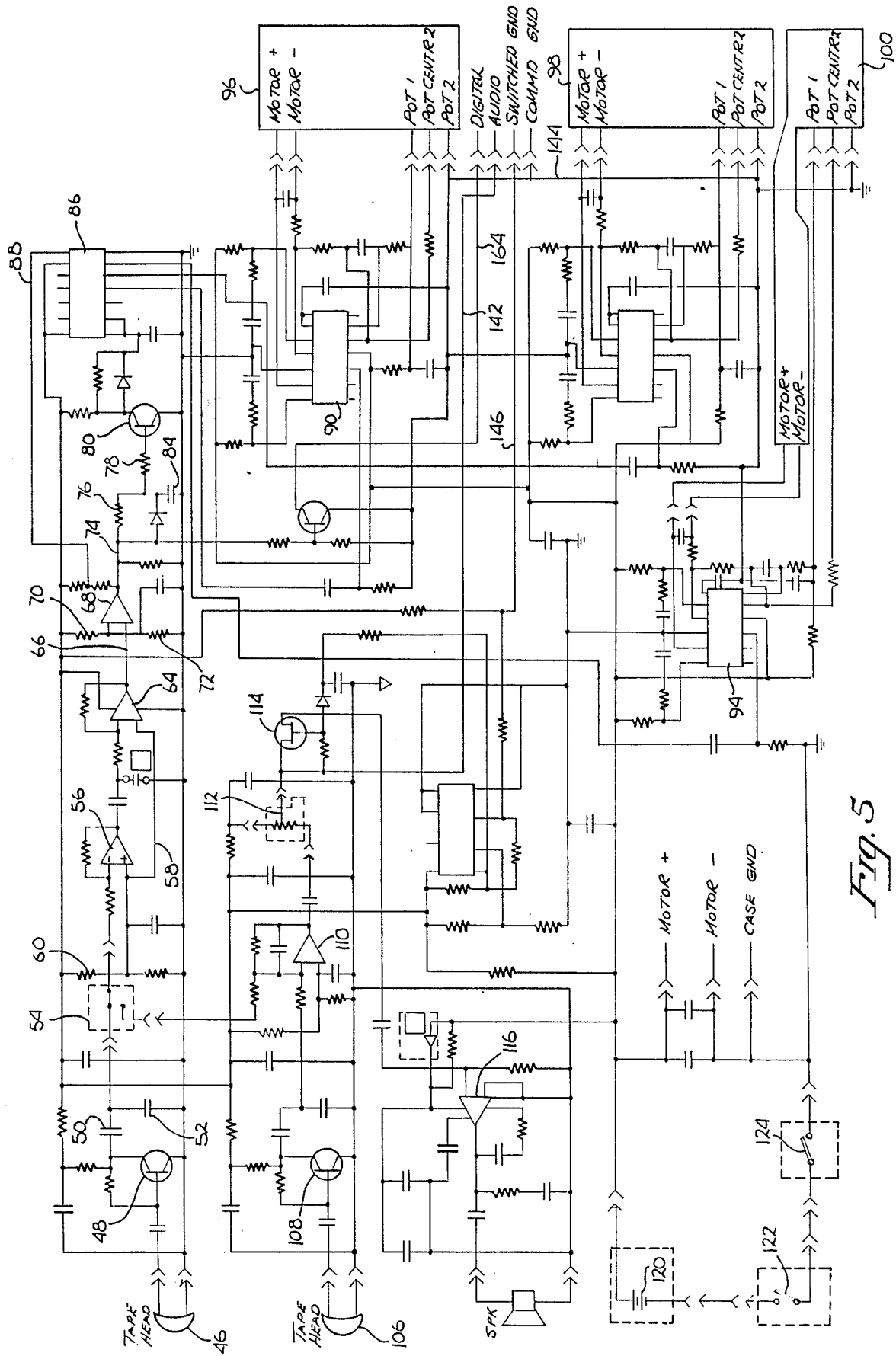
FIG. 5 is a schematic of one embodiment of the master unit.

Now referring to FIG. 5, details of the electronics within the master unit 20 may be seen. Playback head 46 reads the animation track on the cassette, the output of which is amplified by an AC coupled preamplifier comprising transistor 48 and associated resistors and capacitors. The amplified signal in turn is AC coupled through capacitor 50, high frequency roll off being provided by capacitor 52, to a switch 54 normally in the position shown to couple the pulse width modulated signals to a second amplifier 56 for further amplification. A reference voltage on line 58 created by resistors 60 and 62 coupled between the power and ground lines provides a reference to an amplifier 64 having an output on line 66 which is an amplification of the analog signal recovered from the tape head 46 (somewhat shaped), and now referenced to the reference voltage determined by resistors 60 and 62. The signal on line 66 in turn is coupled to one input of a comparator 68, the other input thereto being determined by a pair of resistors 70 and 72 also coupled between the power and ground lines so that the output of comparator 68 on line 74 is the recovered but still pulse width modulated signal, albeit inverted from the form illustrated in FIG. 3. In essence, the signal on line 66 is a significantly distorted analog signal corresponding to the general wave shape of the signal of FIG. 3, though as hereinbefore stated, having clearly discernible high and low levels which in turn are detected by the comparitor 68 to effectively "clean up" the wave form on line 74.

The signal on line 74 is coupled through resistors 76 and 78 to transistor 80, with resistor 76 being bypassed by diode 82 and the junction between resistors 76 and 78 being coupled to ground through capacitor 84. In essence, this circuit operates as a sync pulse generator. In particular, for each sync pulse the signal on line 74 will go low (the inverse of the signal illustrated in FIG. 2) for at least 6 milliseconds. This back biases diode 82, allowing capacitor 84 to discharge through resistor 76, pulling the base of transistor 80 low and pulling pins 1 and 2, the input pins of shift register 86, high to shift a positive signal into the shift register. Thereafter, as each successive channel signal appears on line 74, that line is pulsed high, charging capacitor 84 through diode 82, that pulsing occurring sufficiently frequently for successive channel signals to not again load the register 86 until the occurrence of the next sync pulse. However, the leading positive pulse (the inverse of the wave form shown in FIG. 3) of each channel signal on the output of comparator 68 provides a clock signal on line 88 to clock the single bit loaded by the sync signal through the shift register 86. In that regard the shift register in the embodiment illustrated is a 74C164, an 8 bit shift register, so that the 9 channel signals (FIG. 2) will result in the bit being clocked through the shift register, appearing at each successive parallel output for a time duration dependent upon the duration of the corresponding channel signal, (FIG. 3) the 9th channel shifting that bit out of the shift register so as to not create a false channel signal during the following sync time.

In the embodiment shown in FIG. 5, three of the signals recovered through shift register 86 are provided to a respective one of the three servo amplifiers 90, 92 and 94 (SN76604N's manufactured by Texas Instruments), each of which drives a respective servo motor 96, 98 and 100, each having a feedback pot thereon to provide a position feedback to the servo amplifier. The three servo motors may be each connected to an individual animation element such as by way of example the eyes, nose and jaw of the animated character to make the nose and jaw move in synchronism with the voice signal, etc.

The signal on line 74 is also coupled through transistor 102 to provide a switching signal on line 104, one of the four lines of cable 24 connecting the master unit 20 and slave unit 22 (FIG. 1).

The first head 106, picking up the first or voice track on the cassette, provides a signal to a preamplifier comprising transistor 108 and associated circuitry, the output of which is coupled through amplifier 110. The output of the amplifier in turn is coupled to a manual volume control 112 and a switching transistor 114 to a power amplifier 116 to drive speaker 118 in the master unit 20 when the switching transistor 114 is turned on and power is otherwise supplied to the system. In that regard power to the master unit is provided by batteries 120 therein, with an on/off switch and end of tape switch 122 and 124 being provided for the manual turn on and the automatic turn off of the system.

It will be noted that amplifier 110 in the master unit is coupled as a summing amplifier receiving an additional signal derived from the first track by head 46 whenever switch 54 is in the opposite position. Switch 54 is a mechanical switch appropriately disposed in the playback unit 26 in the master so as to be engaged by a conventional tape cassette when inserted thereinto to move the switch 54 to its alternate position, thereby shifting the signal from head 46 to be summed by amplifier 110 as an additional signal to be reproduced by speaker 118. Animation cassettes, on the other hand, recorded in accordance with the present invention, are provided with an appropriate depression or hole for clearance of the mechanical switching element of switch 54 to allow the switch to remain in the position illustrated in FIG. 5. The net effect therefore is that upon insertion of an appropriately recorded animation cassette, the system will operate as hereabove described, though upon insertion of a standard stereo cassette, switch 54 is switched to decouple the corresponding sound track from the animation control and to couple that track to summing amplifier 110 so that the signals from the two sound tracks are summed by the amplifier and reproduced as a monaural channel by speaker 118. Consequently, the system can be used by a child as a conventional tape playback unit without damage to the unit and/or undesired and unpredictable control of the animation elements.

Now referring to FIG. 5, a circuit diagram for the circuit in a slave unit 22 may be seen. The signal appearing on line 104 of FIG. 5 is of course directly coupled to line 104 of FIG. 6, resistors 126 and 128 acting as pullup resistors for the output of transistor 102. Transistors 130 and 132 in combination with the associated circuitry effectively provide recovery of the sync pulse, as does transistor 80 and the associated circuitry of FIG. 5 hereinbefore described. Accordingly, on the appearance of a sync pulse a single bit is loaded into shift register 134, again being clocked therethrough by the clock signal appearing on line 136 (see the explanation of the clock signal on line 88 with respect to FIG. 5). Thus the signal appearing on each channel is effectively recovered at the slave unit also, though in order to provide independent animation of the slave unit, three channels not used by the master unit are used by the slave unit to control motors 136, 138 and 140 through associated servo amplifiers in the same manner as explained with reference to FIG. 5.

Referring again for the moment to FIG. 5, it will be noted that the output of the volume control 112 is also coupled to line 142 forming one of the lines in cable 26 so that the audio signal is available in the slave unit. The third line in cable 26 is the common ground line 144. Finally, a fourth line 146 is provided in cable 26, the line actually providing an audio control signal from the slave unit to the master unit, and providing the additional function of controlling power in the slave unit from the master unit. In particular, the slave unit is supplied with its own battery supply 148, power being supplied to the slave unit through line 150 as controlled by transistors 152 and 154. Thus when power to the master unit is turned off, line 146 will go to ground, thereby turning off transistor 154 which turns off transistor 152, shutting off power to the remainder of the slave electronics. Resistors 156 and 158 are selected however, so that any voltage on line 146 on the order of one volt or higher will turn on power to the slave unit, making voltages above approximately one volt on line 146 available for additional control purposes. Thus one of the channels of animated data recovered in the slave unit, specifically channel 5, is an audio control signal appearing on line 160 which is coupled through two adjustable RC networks to effectively provide input signals of different time constants to each of two D type flip-flops in the dual D flip-flop 162. The flip-flops are clocked by the leading pulse of the next successive chanel so as to effectively clock in the level or state of the two inputs as they exist at the end of the channel 5 signal time. If channel 5 signal time is less than 1.3 milliseconds, (inadequate time for the respective capacitor to change to the flip-flop threshold) line 170 will be held low, holding switching device 172 off to decouple the audio signal on line 142 from the power amplifier 174 which would otherwise drive speaker 176 in the slave unit. Similarly the output of the other D type flip-flop on line 178 will also be low, holding transistor 180 off, allowing resistor 182 (see FIG. 5) to hold transistor 114 on to provide the audio signal to speaker 118 of the master device.

If the signal on channel 5 is approximately 1.5 milliseconds in duration, one of the D type flip-flops will be set on the next clocking thereof, driving line 170 high to turn on transistor 172 to couple the audio signal through line 142 to power amplifier 174 and speaker 176 so that the speaker in the slave unit will be on also. Finally, for a signal on channel 5 of a duration approaching 2 milliseconds the other D type flip-flop will be set on the next clocking thereof, turning on transistor 180 to pull line 146 toward the low state (but not sufficiently low to turn off power to the slave unit). This drop in voltage on line 146 is coupled through resistor 182 of FIG. 5 to the gate of transistor 114, thereby turning off that device to decouple the audio signal from power amplifier 116 and speaker 118 in the master unit. Thus it may be seen that the single channel may be used to control which or both speakers are operative at any given time, thereby switching the apparent source of the voice between the master and slave unit, depending upon which unit is supposed to be speaking at any particular time.

From the foregoing it is apparent that the concepts of the present invention may readily be extended to additional slave units as the recording of the pulse width modulation signal on one track of the dual track cassette without further modulating that signal on any carrier allows the recording and playback of a relatively high number of animation control signals with a sufficient repetition rate to assure excellent animation characteristics of a plurality of elements on each of a plurality of units. In that regard, while the pulse width modulated signals used with the present invention could be modulated on a carrier for recording purposes, some of the advantages of the present invention would be lost by doing so, as that modulation would unduly raise the recording and playback frequency requirements of the system, or more realistically, limit the number of channels on which signals of reasonable repetition rates could be obtained to limit the required frequency range to that readily obtainable with reasonably priced equipment. Further, one could use other forms of signal modulation such as, by way of example, a fixed frame length pulse width modulation, though the variable frame length has the advantage of generally providing a higher repetition rate because of the average values rather than the extreme values normally determining the repetition rate. Also, obviously the speaker control could readily be located in the master unit, though in the preferred embodiment is located in the slave unit for economic reasons to shift at least part of the cost of the system from the master unit to the slave unit.

The preferred embodiment of the present invention as described herein utilizes a standard tape cassette (modified to provide the audio control switching as hereinbefore described) and a corresponding playback unit in the master stuffed animal. It should be noted however, that other forms of recording and playback may be used if desired. By way of example, microcassettes could be used rather than standard cassettes, allowing the playback unit to be substantially smaller and yet still preserve adequate playback time. Still other recording media and playback devices could also be used such as, by way of further example, laser disks and vinyl records, to name but two additional techniques, as substantially any recordable medium with compatible playback devices having at least two tracks or playback channels may be used. In that regard, the word "recording" as used herein and in the claims that follow is used in a general sense rather than a strict technical sense. By way of specific example, vinyl records are reproduced by pressing hot vinyl in a mold and accordingly, the finished record is only an indirect recording, whereas magnetic tape, whether in reel, cassette, microcassette or other form is generally sequentially recorded utilizing a duplication process, so as to be a more direct form of recording. Thus the word "recording" is used herein to mean and include the various forms of both direct and indirect recording as are well known, the essential feature of course being the ability of whatever medium is used to preserve "recorded" information and act as a suitable playback medium.

Thus while the preferred embodiment of the present invention has been disclosed and described in detail herein, it will be understood by those skilled in the art that various changes in form and detail may be made therein without departing from the spirit and scope of the invention.

What is claimed is:

1. A method of recording and playing back a plurality of animation control signals for the control of animated elements in synchronism with an audio signal comprising:
    (a) recording the audio signal on a first track of a playback medium;
    (b) repetitively generating as an animation signal and recording the same on a second track of the playback medium without modulation on a carrier, animation control signal frames, each frame having a reference signal and a plurality of successive channel signals, at least some of the successive channel signals being pulse width modulated responsive to a desired animation to provide control of a respective animated element having a predetermined range of motion synchronized to the audio signal wherein said control causes said respective animated element to move proportionally in response thereto anywhere within the predetermined range of motion of said element;
    (c) playing back the first track to provide the audio signal to a speaker, and simultaneously playing back the second track to provide an alternating current coupled signal responsive to the animation signal;
    (d) detecting transitions between high and low levels in the animation signal to detect the occurrence of the reference signal and responding to the width of the channel signals to recover the channel signals responsive to the desired animation; and
    (e) controlling a drive means for each respective animation element in response to the respective recovered channel signal in synchronism with the audio signal.

2. The method of claim 1 wherein step (a) comprises the step of recording the audio signal on a first track of a playback medium having at least one detectable difference from a medium on which prerecorded multichannel audio recordings are commercially available, and further comprising the step of detecting the presence or absence of the detectable difference prior to step (c), and upon detection of the absence of the detectable difference, causing the second track of a prerecorded multichannel audio recording to also be played back as an audio signal and not be processed as containing animation control signals.

3. The method of claim 2 wherein step (a) comprises the step of recording the audio signal on a first track of a playback medium having at least one physical difference, detectable by a mechanical switch in the playback unit, from a medium on which prerecorded multichannel audio recordings are commercially available.

4. The method of claim 1 wherein step (b) comprises the step of repetitively generating as an animation signal and recording the same on a second track of the playback medium without modulation on a carrier, animation control signal frames, each frame having a reference signal and a plurality of successive channel signals, at least some of the successive channel signals each being a pulse width modulated signal responsive to the desired animation of a respective animated element synchronized to the audio signal, the animation control signal frames having a varying frame length dependent upon the channel signals.

5. A method of recording and playing back a plurality of proportional control animation signals for the control of animated elements of at least two animated characters in synchronism with an audio signal comprising:
   (a) recording the audio signal on a first track of a playback medium;
   (b) repetitively generating as an animation signal and recording the same on a second track of the playback medium without modulation on a carrier, animation control signal frames, each frame having a reference signal and a plurality of successive proportional control channel signals, said control channel signals for providing proportional control of animated movements by said animated characters, at least some of the successive proportional control channel signals being pulse width modulated responsive to the desired animation of a respective animated element having a predetermined range of motion of one of the animated characters synchronized to the audio signal, wherein said control signals cause said respective animated element to move proportionally in response thereto anywhere within said predetermined range of motion;
   (c) playing back the first track to provide the audio signal to a speaker, and simultaneously playing back the second track to provide an alternating current coupled signal responsive to the animation signal;
   (d) coupling the alternating current coupled signal responsive to the animation signal to each of the animated characters;
   (e) in each of the animated characters, detecting the transition between the high and low levels in the animation signals to detect the occurrence of the reference signals and responding to the width of the channel signals to recover the proportional control channel signals responsive to the desired animation of the respective character; and
   (f) moving each respective animation element of the respective character in response to the respective recovered proportional control channel signal proportionally in response thereto anywhere within said predetermined range of motion, thereby in synchronism with the audio signal.

6. THe method of claim 5 further comprising the step of coupling the audio signal to a speaker in each of the animated characters.

7. The method of claim 5 further comprising the step of coupling the audio signal to a speaker in each of the animated characters through a respective speaker control, each of the speaker controls being responsive to at least one of the channel signals, and further comprising the step of recording at least as one of the channel signals, an audio control signal to control which speaker or combination of speakers the audio signal will be coupled to at any particular time on playback.

8. The method of claim 5 wherein step (a) comprises the step of recording the audio signal on a first track of a playback medium having at least one detectable difference from a medium on which prerecorded multichannel audio recordings are commercially available, and further comprising the step of detecting the presence or absence of the detectable difference prior to step (c), and upon detection of the absence of the detectable difference, causing the second track of a prerecorded multichannel audio recording to also be played back as an audio signal and not be processed as containing animation control signals.

9. The method of claim 5 wherein step (a) comprises the step of recording the audio signal on a first track of a playback medium having at least one physical difference, detectable by a mechanical switch in the playback unit, from a medium on which prerecorded multichannel audio recordings are commercially available.

10. The method of claim 5 wherein step (b) comprises the step of repetitively generating as an animation signal and recording the same on a second track of the playback medium without modulation on a carrier, animation control signal frames, each frame having a reference signal and a plurality of successive channel signals, at least some of the successive channel signals each being a pulse width modulated signal responsive to the desired animation of a respective animated element synchronized to the audio signal, the animation control signal frames have a varying frame length dependent upon the channel signals.

11. Apparatus for playing back proportional control animation control signals for proportional control of an animated character comprising
    a character body having a plurality of moveable character elements;
    drive means coupled to each of said moveable character elements, each drive means being responsive to a proportional control animation signal to control the movement of the respective moveable character element;
    a playback means for receiving a prerecorded animation playback medium and deriving first and second signals therefrom and for receiving and detecting the presence of a prerecorded multichannel audio playback medium and deriving first and second audio signals therefrom as said first and second signals, said playback means causing said second audio signal to be diverted to a speaker upon detection of the prerecorded multichannel audio playback medium;
    speaker means coupled to said playback means for providing an audio output responsive to said first signal;
    pulse width demodulator means coupled to said playback means and said drive means for pulse width demodulating said second signal and to recover a plurality of proportional control animation signals therefrom;
    means for proportionally controlling the motion of a respective moveable character element responsive to said recovered plurality of proportional animation signals.

12. The apparatus of claim 11 wherein at least some of said drive means are proportional control drive means.

13. The apparatus of claim 12 wherein the proportional control drive means are linear proportional control drive means.

14. The apparatus of claim 13 wherein the linear proportional control drive means is a servo motor having a position feedback control.

15. Apparatus for playing back animation control signals for control of a plurality of animated characters, each character having
- a character body having a plurality of moveable character elements;
- drive means coupled to each of said moveable character elements, each drive means being responsive to an animation control signal to control the movement of the respective moveable character element;
- speaker means, and pulse width demodulator means;
- one of said characters having a playback means for receiving a prerecorded animation playback medium and deriving first and second simultaneous signals therefrom;
- each of said speaker means being coupled to said playback means for providing an audio output responsive to said first signal;
- each of said pulse width demodulator means being coupled to said playback means and said drive means for the respective character for pulse width demodulating said second signal and to recover a plurality of animation control signals therefrom, for controlling the motion of a respective moveable character element having a predetermined range of motion of the respective character wherein said recovered plurality of animation control signals cause said respective moveable character element to move proportionally in response thereto anywhere within said predetermined range of motion.

16. The apparatus of claim 15 wherein at least some of said drive means are proportional control drive means.

17. The apparatus of claim 16 wherein the proportional control drive means are linear proportional control drive means.

18. The apparatus of claim 17 wherein the linear proportional control drive means is a servo motor having a position feedback control.

19. The apparatus of claim 15 wherein the playback means is also a means for receiving and detecting the presence of prerecorded multichannel audio playback medium and deriving first and second audio signals therefrom, said playback means causing said second signal to be diverted to a speaker upon detection of the prerecorded multichannel audio playback medium.

20. The apparatus of claim 15 further comprised of speaker control means coupled between said playback means and each of said speaker means for controlling the coupling of the signal therebetween, at least one of said pulse width demodulator means being coupled to said speaker control means for controlling which one or combination of speaker means is active at any particular time as controlled by at least one pulse width demodulated signal.

21. Apparatus for playing back animation control signals for control of an animated character comprising
- a character body having a plurality of moveable character elements;
- drive means coupled to each of said moveable character elements, each drive means being responsive to an animation control signal to control the movement of the respective moveable character element;
- a playback means for receiving a prerecorded animation playback medium and deriving first and second simultaneous signals therefrom, said playback means also being a means for receiving and detecting the presence of a prerecorded multichannel audio playback medium and deriving first and second audio signals therefrom, said playback means causing said second signal to be diverted to a speaker upon detection of the prerecorded multichannel audio playback medium;
- speaker means coupled to said playback means for providing an audio output responsive to said first signal;
- pulse width demodulator means coupled to said playback means and said drive means for pulse width demodulating said second signal and to recover a plurality of animation control signals therefrom for controlling the motion of a respective moveable character element.

* * * * *